Figure 1:
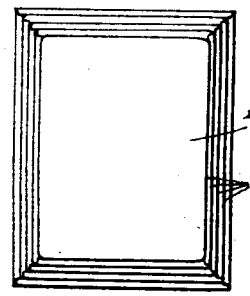

Feb. 26, 1929.

E. PUJALS

SEAT

Filed Dec. 28, 1926

INVENTOR
Enrique Pujals
BY
ATTORNEYS

Patented Feb. 26, 1929.

1,703,779

UNITED STATES PATENT OFFICE.

ENRIQUE PUJALS, OF HABANA, CUBA.

SEAT.

Application filed December 28, 1926, Serial No. 157,588, and in Cuba December 18, 1926.

This invention relates to seats and more especially those designed for vehicles such as automobiles, and street cars, and its principal object is to provide a seat, in the back of same or in the seating part, or in both parts, with a yieldable cushion which will serve to absorb the shocks received by the vehicle while running.

Heretofore travel in vehicles over roads or highways has caused discomfort to the occupants of such vehicles and while attempts have been made to improve the riding conditions by altering the chassis structure and improving in the construction of the tires of the vehicle and making other changes, little improvement has been effected.

My invention overcomes these and other inconveniences of travel in a manner which will be appreciated from a reading of the following specification specially by persons expert in the art to which this invention refers, with the help of the figures of the attached drawing in which corresponding numerals of reference designate the same parts.

Figure 2:
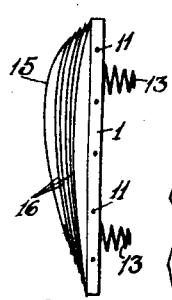

In the drawing:

Figure 1 is a front elevation of the back of a seat provided with the improvement of this invention.
Figure 2 is a side elevation view of same.

Figure 3:
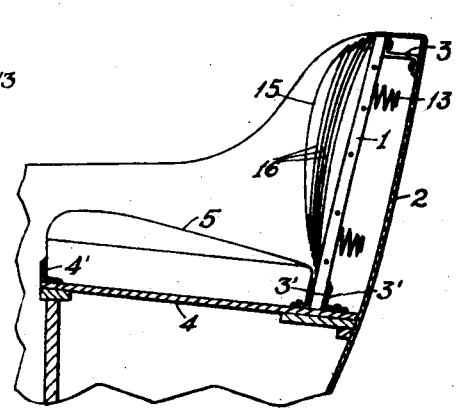
Figure 5:
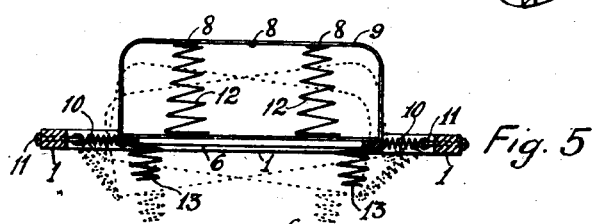
Figure 4:
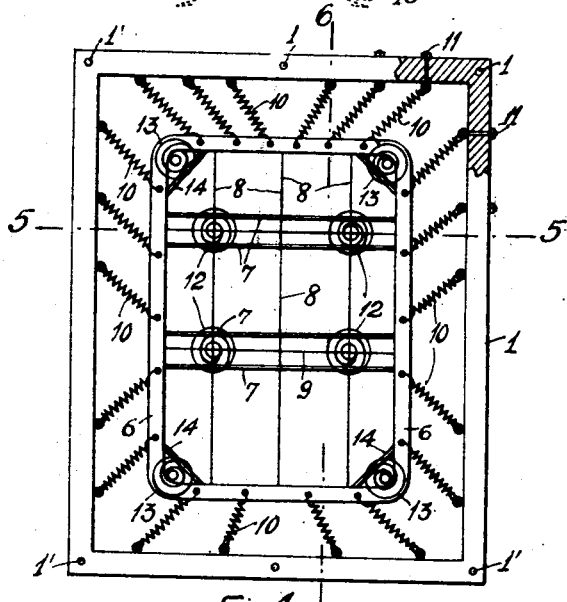
Figure 6:
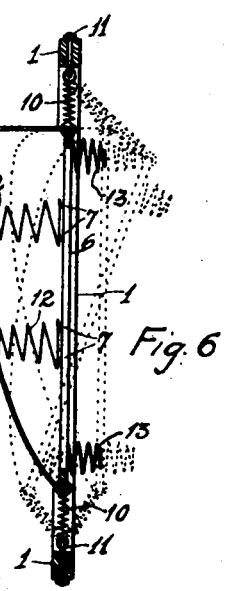

Figure 3 is a view in detail, partly in section and partly in side elevation of a seat constructed in accordance with this invention.
Figure 4 is a detail view, on an enlarged scale of the back of a seat, constructed in accordance with this invention, and without the upholstering to allow a better view of its interior construction.
Figure 5 is a horizontal section, taken on the line 5—5 of Figure 4, and Figure 6 is a vertical section taken on the line 6—6 of Figure 4.

In the drawings, the numeral 1 designates a wooden or metal rectangular frame provided with spaced openings 1' to enable the fastening of same dismountably and spaced with relation to the back part of the body 2 of a vehicle, which in this particular case is an automobile, by means of the angle brackets 3, and to the seating part 4 by means of angular braces 3' and which seat 4 is secured to the body of the vehicle by means of angular braces 4' in the usual way.
Although the seat 4 may be provided with a cushion 5 of the same construction as that which I have begun to describe, I will limit my description in detail to the construction of the cushion applied to the back of the body 2, since the construction of the cushion 5 would be substantially similar to the other.

Arranged in the frame 1, as shown in Figure 4, and on the same normal level with same, there is a smaller frame 6, to the top and bottom members of which the ends of resilient wires 8 are fastened, and bent to project outwardly as shown in Figure 6, in order to constitute a framework with other wires 9 which cross transversally with the wires 8 and are fastened to the sides of the frame 6.

Said frame 6 is supported in spaced relation to the frame 1, in a yieldable manner, by means of coil springs 10, respectively fastened at their ends to eye bolts 11 fixed to both frames 1 and 6 and extending between corresponding members of the frames as clearly shown in the Figure 4, in order to absorb any shock that may be produced.

Under frame 6, and to the sides of same, are fastened the ends of heavier wires 7, which form a bridge, to extend between these and the frame constituted by the wires 8 and 9, the coil springs 12. The numeral 13 designates coil springs fastened to the four corners of the frame 6 and provided with the ties 14.

The covering 15 of the back of the seat is placed to conform to the shape of the framework constituted by the wires 8 and 9 and said covering, in order to adapt itself to the different expansions of the said framework, must be pliable, or in the form of an accordion as shown at 16.

Therefore, a person occupying a seat of this kind will never suffer the effects of the jolts or shocks when the vehicle is in motion, as these shocks, no matter in what direction they are delivered, will be absorbed because of the disposition of the springs 10, which receive the vibrations from all directions, frame 6 moving in the space between the frame, and the back part 2 of the body of the vehicle, as indicated by the different positions illustrated by the lines of points in Figure 6. Therefore, the body of the person will never receive the shock, since this will be transmitted to a yielding body, that is, the described cushion. If the shock is excessively strong so as to force the frame 6 against the back part 2 of the body, the opposition of the springs 10 being subdued, there would be no contact between these two rigid bodies, since between them are the coiled springs 13, provided for such emergency.

With some slight modifications frame 1 could serve as a support to two or more frameworks of the cushion or back, in lieu of serving for one only as shown herein.

I do not wish to be limited to the form of construction shown and illustrated by the drawing, since many changes may be made, within the substantial idea of the invention, which may be applied as herein stated to all kinds of seats, in the back as well as in the seating part thereof.

Claim:

In a vehicle seat, a fixed frame and a smaller frame floatably mounted within said fixed frame normally in the same plane as said fixed frame, spiral springs arranged between said fixed and floating frames and affording means for supporting said floating frame from said fixed frame, said springs being connected to the upper part of said floating frame and inclining upwardly and outwardly on opposite sides of the median line extending from the top to the bottom of said frame, those springs being connected to the lower part of said floating frame inclining downwardly and outwardly with respect to said median line, and springs provided on one side of said floating frame and projecting outwardly therefrom, said fixed and floating frames being adapted to be positioned with respect to the vehicle in which the same may be installed, so that said last named springs lie adjacent, but out of contact with a fixed part of the vehicle but close enough to certain fixed part to contact with the same when said floating frame is deflected from the plane of said fixed frame by excessive vibrations of said vehicle.

In testimony whereof I have signed my name to this specification.

ENRIQUE PUJALS.